(12) United States Patent
Kominar et al.

(10) Patent No.: US 10,489,134 B2
(45) Date of Patent: Nov. 26, 2019

(54) REQUESTING RESOURCE ACCESS PERMISSIONS

(71) Applicant: BlackBerry Limited, Waterloo (CA)

(72) Inventors: Jeremy Lawson Kominar, Waterloo (CA); Neil Patrick Adams, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 318 days.

(21) Appl. No.: 15/152,926

(22) Filed: May 12, 2016

(65) Prior Publication Data
US 2017/0329589 A1 Nov. 16, 2017

(51) Int. Cl.
| | | |
|---|---|---|
| G06F 9/44 | (2018.01) | |
| G06F 8/61 | (2018.01) | |
| H04W 88/02 | (2009.01) | |
| G06F 21/62 | (2013.01) | |
| H04L 29/06 | (2006.01) | |
| H04W 12/08 | (2009.01) | |
| H04W 12/00 | (2009.01) | |

(52) U.S. Cl.
CPC .............. *G06F 8/61* (2013.01); *G06F 21/629* (2013.01); *H04L 63/10* (2013.01); *H04W 12/0023* (2019.01); *H04W 12/0027* (2019.01); *H04W 12/08* (2013.01); *H04W 88/02* (2013.01); *H04L 63/1425* (2013.01)

(58) Field of Classification Search
CPC ........................................................ G06F 9/445
USPC ................................................. 717/174–178
See application file for complete search history.

(56) References Cited

U.S. PATENT DOCUMENTS

| | | | | |
|---|---|---|---|---|
| 7,472,286 | B2 | 12/2008 | Burkhardt et al. | |
| 2003/0014468 | A1* | 1/2003 | Sudhakaran | G06F 9/52 718/104 |
| 2005/0235288 | A1* | 10/2005 | Yamakabe | G06F 9/5072 718/100 |
| 2010/0138833 | A1* | 6/2010 | Franklin | G06F 11/3676 718/100 |
| 2011/0131589 | A1* | 6/2011 | Beaty | G06F 9/5077 719/318 |

(Continued)

FOREIGN PATENT DOCUMENTS

| | | |
|---|---|---|
| EP | 2431897 | 3/2012 |
| WO | 2014/185990 | 11/2014 |

OTHER PUBLICATIONS

Extended European Search Report issued in European Application No. 17170234.3 dated Sep. 1, 2017; 9 pages.

(Continued)

*Primary Examiner* — Jae U Jeon
(74) *Attorney, Agent, or Firm* — Fish & Richardson P.C.

(57) ABSTRACT

Systems, methods, and software can be used to share content. In some aspects, the electronic device receives an installation manifest for an application. The installation manifest indicates one or more resources on the electronic device that the application is configured to access. The electronic device receives resource usage information associated with the application. The resource usage information indicates how often the application uses at least one resources. A resource permission request for the application is outputted on the electronic device based on the installation manifest and the resource usage information.

14 Claims, 2 Drawing Sheets

(56) References Cited

U.S. PATENT DOCUMENTS

| | | | |
|---|---|---|---|
| 2012/0265804 A1* | 10/2012 | Ashcraft | G06F 9/5016 |
| | | | 709/203 |
| 2012/0317638 A1* | 12/2012 | Carrara | G06F 21/44 |
| | | | 726/17 |
| 2017/0156095 A1* | 6/2017 | Balan | H04W 36/22 |

OTHER PUBLICATIONS

Android Developers; "App Manifest"; retrieved from http://developer.android.com/guide/topics/manifest/manifest-intro.html on Mar. 23, 2016; 9 pages.
Communication pursuant to Article 94(3) EPC issued in European Application No. 17170234.3 dated Jul. 25, 2018, 5 pages.
Communication pursuant to Article 94(3) EPC issued in European Application No. 17170234.3 dated Feb. 14, 2019, 5 pages.
Communication under Rule 71(3) EPC issued in European Application No. 17170234.3 dated May 16, 2019, 7 pages.

* cited by examiner

REQUESTING RESOURCE ACCESS PERMISSIONS

TECHNICAL FIELD

The present disclosure relates to requesting resource access permissions.

BACKGROUND

In some cases, electronic devices, including mobile devices or other computer systems, enable users to run applications on the electronic devices. The applications can access resources of the electronic devices when executed. Examples of the resources can include an application, set of applications, software, software modules, hardware, or any combinations thereof that can be configured to provide information or services. For example, a resource can be a camera, a microphone, a location determination module, e.g., a Global Positioning Service (GPS) module, contact information, text or multimedia messaging module, folders and files, and etc.

DESCRIPTION OF DRAWINGS

Like reference numbers and designations in the various drawings indicate like elements.

DETAILED DESCRIPTION

In some cases, an application developer may create an installation manifest. The installation manifest can list the resources that the application can access when executed. When the application is installed, a permission request can be outputted on the electronic device. The permission request can list all the resources included in the installation manifest. If the user grants the permission, the application can be installed and can access the resources when the applications are executed. If the user denies the permission, the application may not be installed.

In some cases, an application developer may include resources that the application does not access in the installation manifest. This scenario may happen due to one or more reasons. For example, the application developer may want to avoid running into permission issues later, the application developer may forget to remove the resource after a feature is removed from the application, the application developer may mistakenly include the resource due to an error in creating the installation manifest. In some cases, an installation may fail because a user does not want to grant permission to certain resources which is included in the installation manifest but not actually used by the application.

In some cases, resource usage information can be sent to the electronic device that requests to download the application. The resource usage information can indicate that a resource included in the installation manifest is not used by the application. The resource usage information can also indicate how often the application uses the resources. A resource permission request can be generated based on the received resource usage information. Therefore, a user can view the usage information about the application that they are downloading and make an informed decision on whether to grant the permission. FIGS. 1-4 and associated descriptions provide additional details of these implementations.

Figure 1:
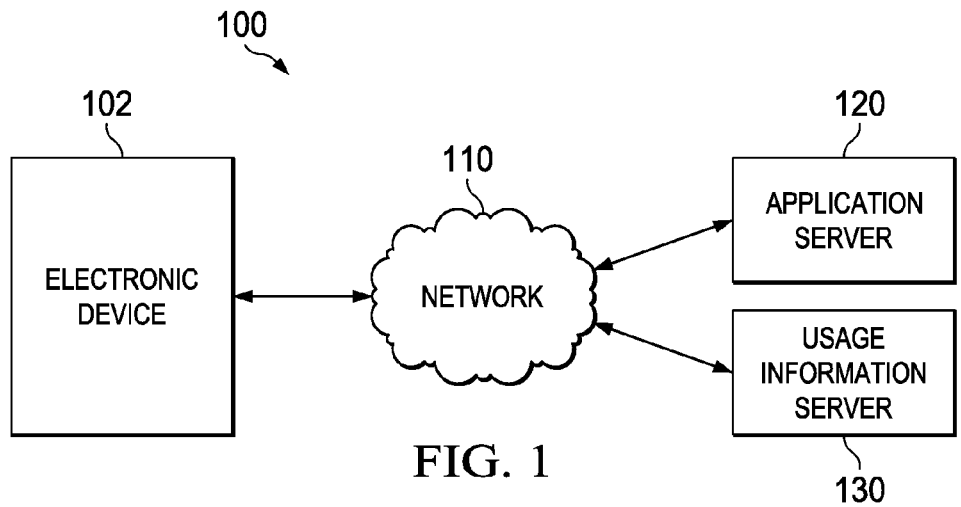
FIG. 1 is an example communication system that generates resource permission requests according to an implementation.

FIG. 1 is an example communication system 100 that generates resource permission requests according to an implementation. At a high level, the example communication system 100 includes an electronic device 102 that is communicably coupled with an application server 120 and a usage information server 130 over a network 110.

The application server 120 represents an application, set of applications, software, software modules, hardware, or any combinations thereof that can be configured to provide applications to one or more electronic devices 102. In some implementations, the application server 120 can include an application store or an application market that stores applications for electronic devices 102 to download. A user can have a user account registered with the application server 120. A user can use a client application operating on the electronic device 102 to access the application server 120, log onto the application using the user's account, select one or more applications to download.

In some cases, the application server 120 can include an enterprise mobility management (EMM) server. The EMM server can manage applications and devices for an enterprise. For example, the EMM server can install, update, and manage the license of enterprise applications for the electronic device 102. Alternatively or additionally, the application server 120 can be communicatively coupled with an EMM server that is located on a different hardware platform.

Figure 3:
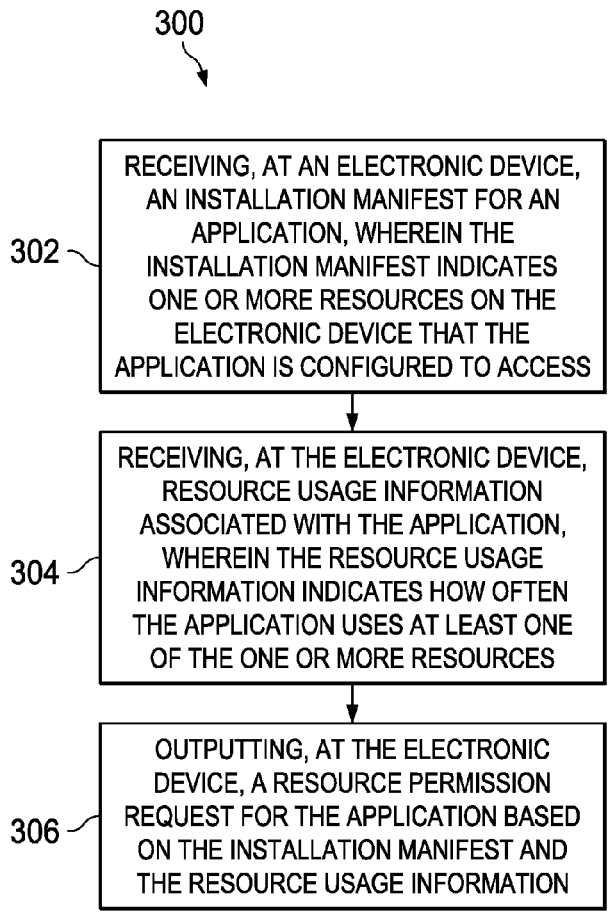
FIG. 3 is a flow diagram showing an example process for generating resource permission requests according to an implementation.
Figure 4:
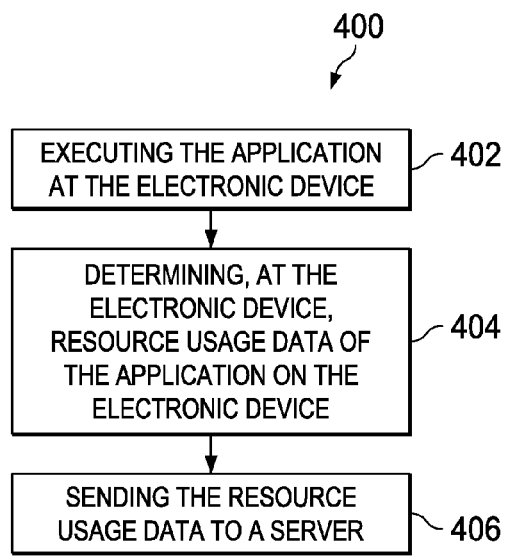
FIG. 4 is a flow diagram showing an example process for collecting resource usage data according to an implementation.

The usage information server 130 represents an application, set of applications, software, software modules, hardware, or any combinations thereof that can be configured to collect resource usage data from one or more electronic devices 102. The usage information server 130 can compile the resource usage data, perform statistical analysis, and provide the compiled results to the application server 120. FIGS. 3-4 and associated descriptions provide additional details of these implementations. In some cases, the usage information server 130 can be included in an EMM server. The usage information server 130 and the application server 120 can be located on the same hardware platform. Alternatively or additionally, the usage information server 130 and the application server 120 can be located on different hardware platforms and communicate over the network 110.

The example communication system 100 includes the network 110. The network 110 represents an application, set of applications, software, software modules, hardware, or any combinations thereof that can be configured to provide communications for one or more devices in FIG. 1, e.g., the electronic device 102, the application server 120, the usage information server 130, or a combination thereof. The network 110 includes a wireless network, a wireline network, or a combination thereof. For example, the network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), or LTE-Advanced. In some instances, the core networks may be evolved packet cores (EPCs).

A RAN is part of a wireless telecommunication system which implements a radio access technology, such as GSM, UMTS, CDMA2000, 3GPP LTE, and 3GPP LTE-A. In many applications, a RAN includes at least one base station, e.g., the base station 106. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

Figure 2:
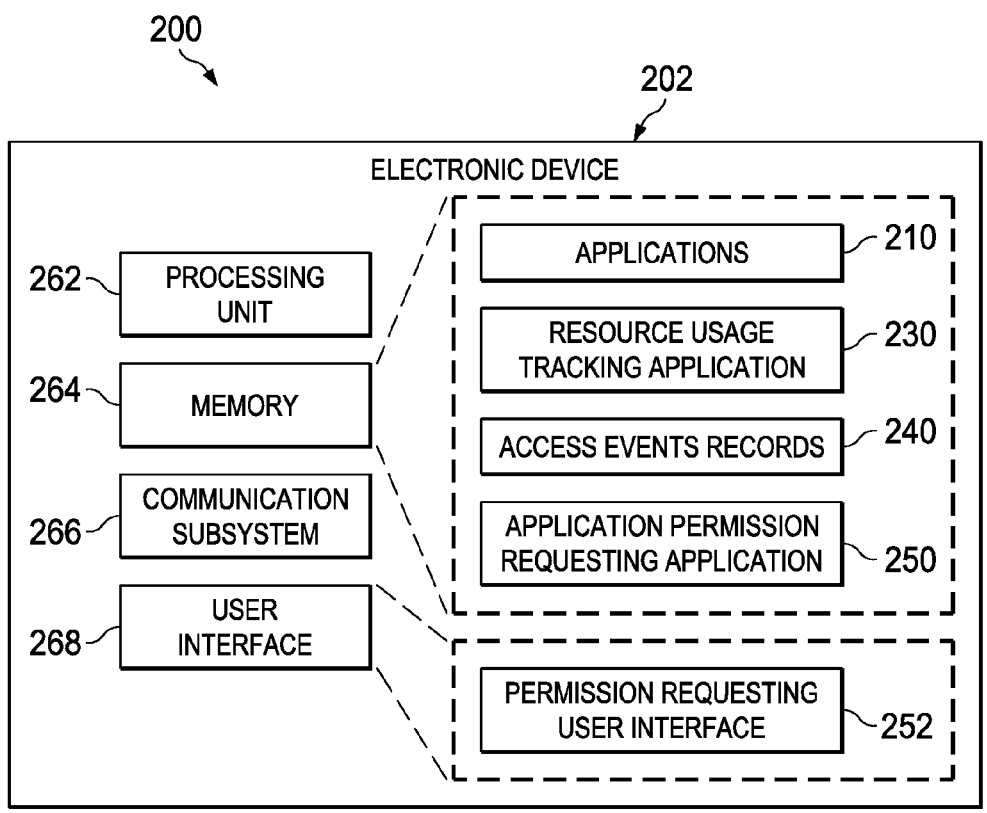
FIG. 2 is a schematic diagram showing an electronic device that generates resource permission requests according to an implementation.

The electronic device 102 represents an application, set of applications, software, software modules, hardware, or any combinations thereof that can be configured to generate resource permission requests. The electronic device 102 can also monitor resource usages of the applications operating on the electronic device 102 and report resource usage data to the usage information server 130. FIGS. 2-4 and associated descriptions provide additional details of these implementations.

In operation, the electronic device 102 requests to download an application from the application server 120. The application server 120 can send the application and the resource usage information of the application to the electronic device 102. The electronic device 102 can generate resource permission requests based on the resource usage information. A user can grant the resource permission requests to install the application. The electronic device 102 can monitor the resource usage of the application and send resource usage data to the usage information server 130. The usage information server 130 can provide resource usage information associated with the application to the application server 120. FIGS. 2-4 and associated descriptions provide additional details of these implementations.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a schematic diagram 200 showing an electronic device 202 that generates resource permission requests according to an implementation. In some cases, the electronic device 202 can be used to perform the function as the electronic device 102 shown in FIG. 1. The electronic device 202 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 268 can be configured to present a permission requesting user interface 252. The permission requesting user interface 252 represents a graphic user interface that outputs one or more user interface objects for granting a resource access permission for an application. The permission requesting user interface 252 can include a list of resources that an application can access when executed and the usage information for the resources on the list. A user can determine whether to grant or deny the permission using the one or more user interface objects.

The example memory 264 can be a computer-readable storage medium on the electronic device 202. Examples of the memory 264 include volatile and non-volatile memory, magnetic media, optical media, random access memory (RAM), read-only memory (ROM), removable media, and others. The memory 264 can store an operating system (OS) of electronic device 202 and various other computer-executable software programs for performing one or more of the processes, steps, or actions described above.

As shown in FIG. 2, the example memory 264 can include one or more applications 210. The applications 210 include programs, modules, scripts, processes, or other objects that can be configured to access one or more resources in the electronic device 202. For example, applications 210 can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the electronic device 202, one or more processes associated with an application may be stored, referenced, or executed remotely. For example, a portion of an application may be an interface to a web service that is remotely executed. Moreover, an application may be a child or sub-module of another software module (not illustrated). The applications 210 can include native applications in the operating systems, enterprise applications administrated by an employer of the user, or third-party applications downloaded by the user.

The example memory 264 can include a resource usage tracking application 230. The resource usage tracking application 230 represents an application, set of applications, software, software modules, hardware, or any combinations thereof that can be configured to track resource access of the applications 210. The resource usage tracking application 230 can determine which resource is accessed and how often the resource is accessed by one or more applications 210. The resource usage tracking application 230 can store the resource usage data for the applications 210 in the access events records 240. The resource usage tracking application 230 can also report the resource usage data to a server. FIGS. 3-4 and associated descriptions provide additional details of these implementations.

The example memory 264 can include an application permission requesting application 250. The application permission requesting application 250 represents an application, set of applications, software, software modules, hardware, or any combinations thereof that can be configured to generate resource permission requests. The application permission requesting application 250 can receive resource usage information for an application. The application permission requesting application 250 can generate resource permission requests based on the resource usage information. FIGS. 3-4 and associated descriptions provide additional details of these implementations.

Turning to a general description, an electronic device, e.g., the electronic device 202, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 3 is a flow diagram showing an example process 300 for generating resource permission requests according to an implementation. The process 300 can be implemented by an electronic device, e.g., the electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, an installation manifest for an application is received at an electronic device. The installation manifest identifies one or more resources that the application is configured to access when the application is executed on the electronic device.

In some cases, the installation manifest can be included in an application manifest. The application manifest can include information that describes the application, e.g., the information that an operating system (OS) needs to have before executing the application. Examples of the information included in an application manifest can include a name of the JAVA package for the application, components of the application, the processes that host the components of the application, the level of the application programming interface (API) that the application requires, and the libraries that the application can be linked against.

The application manifest can be formatted according to the OS in which the application is configured to be executed. For example, an application manifest for an application that operates in an IOS can use a different format than an application manifest for an application that operates in an ANDROID OS. In some implementations, the application manifest can be an EXtensible Markup Language (XML) file. The application manifest can be included in a root director of the application.

In some cases, the installation manifest, along with other information included in the application manifest, can be generated by an application developer that creates the application. The application developer can upload the installation manifest with the application to an application server. The installation manifest can be stored in the application, e.g., in the root directory of the application, or on the application server. When an electronic device downloads the application from the application server, the electronic device can download the installation manifest with the application from the application server.

At 304, resource usage information associated with the application is received at the electronic device. The resource usage information can indicate resource access information related to the application. In one example, the resource usage information can indicate one or more resources that can be used by the application when executed. In some cases, the resources indicated by the resource usage information can be different from the resources indicated by the installation manifest. For example, a resource may be included in the installation manifest, which indicated that the application is configured to access the resource when executing. However, the resource may not be included in the resource usage information, which indicates that the resource may not be used by the application when executed.

In some cases, the resource usage information can be determined based on inspections on the application code. For example, the binary code of the application can be inspected to determine which APIs may be called by the application. Example of the binary code can include a classes.dex file of the application. Because an application uses an API to access a resource, if an API call is found in the code, the resources corresponding to the API can be included in the resource usage information. The resource usage information can be determined by the application server that hosts the application. Alternatively or additionally, an application inspection program can be run by a third party server and the determined resource usage information can be sent to the application server. When an electronic device downloads the application, the application server can send the resource usage information to the electronic device.

Additionally or alternatively, the resource usage information can also indicate resource usage patterns for the application. For example, the resource usage information can indicate how often the application uses the at least one of the one or more resources. In one implementation, resource usage information can be collected by a plurality of electronic devices that execute the application. The plurality of electronic devices can send the resource usage information to a usage information server. The usage information server can consolidate the resource usage information, perform statistical analysis, and compile the resource usage information. The compiled resource usage information can be sent to the application server. When an electronic device downloads an application from the application server, the electronic device can also download the compiled resource usage information. FIG. 4 and associated descriptions provide additional details of these implementations.

At 306, a resource permission request for the application is outputted at the electronic device. The resource permission request can be generated based on the resource listed in the installation manifest and the resource usage information. In one implementation, the electronic device determines a list of resources to request permission based on both the installation manifest and the resource usage information. For example, if a resource is included in the installation manifest but not in the resource usage information, then the resource will probably not be used. Therefore, the resource may not be included in the permission request. Alternatively or additionally, if a resource is included in the installation manifest but not in the resource usage information, the resource may be included in the permission request, while the permission request includes a notification indicating that while the permission for the resource is requested, the resource may not be used by the application. The notification can be implemented using text, icon, button, box, strikethrough or any other graphic user interface objects.

In some cases, the permission request can also indicate how often the application uses the at least one of the one or more resources. For example, for each resource listed for permission request, usage information can be outputted. In one example, the usage information can indicate the percentage of time in which the application has accessed the resource in one execution. For example, the usage information can indicate that for every 100 executions of the application, a particular resource, e.g., a microphone, is accessed on average 5 times. Additionally or alternatively, the usage information can indicate the percentage of users that have accessed the resource. For example, the usage information can indicate that 10K users have downloaded the application, and 5% of these users have reported that a particular resource, e.g., a microphone, has been accessed when executing the application.

Including the usage information in the permission request can enable the user to make an informed decision to determine whether to grant the resource permission. A user can grant or deny permission for resources based on the resources that are actually used by the application and on how often these resources are used, instead of based on the resources that are listed by the application developer.

The usage information can be included in the permission request that is outputted on the electronic device during the installation procedure. If the user grants the permissions to a list of resources included in the permission request, the user can complete the installation and execute the application. Alternatively or additionally, the usage information can be included in the permission request that is outputted on the electronic device when the application is executed. For example, the usage information can be included in the permission request that is outputted when the application is executed for the first time, when the application attempts to access a resource during runtime, or a combination thereof. In one example, when executed, the application can request to access a resource that has not received a permission grant, e.g., the resource may be omitted because the resource is not included in the resource usage information received by the electronic device during installation. In these or other cases, the execution of the application can be terminated. Alternatively or additionally, a permission request for that particular resource can be outputted on the electronic device. The permission request can include the usage information. The user can grant the permission and continue the execution of the application, or deny the permission and terminate the application.

FIG. 4 is a flow diagram showing an example process 400 for collecting resource usage data according to an implementation. The process 400 can be implemented by an electronic device, e.g., the electronic device 102 shown in FIG. 1. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order.

At 402, the application is executed at the electronic device. At 404, resource usage data of the application is determined. In some cases, a surveillance application, e.g., the resource usage tracking application 230, operating on the electronic device can be configured to keep track of resource access by one or more applications. The surveillance application can be part of the OS operating on the electronic device. Alternatively or additionally, the surveillance application can be provided by a third party vendor and operate in background on the electronic device.

The resource usage data collected by the surveillance application can include which resources are accessed by the application, how often each resource is accessed, and the usage pattern of the resource access. In one example, the surveillance application can monitor the network usage of the application. The surveillance application can collect information about how many voice calls are made and how long the voice calls last, how many messages, e.g., short message service (SMS) message are sent and received by the application, how much data is downloaded and uploaded by the application. In another example, the surveillance application can monitor the microphone access of the application, e.g., how often and how long the microphone is being turned on. In yet another example, the surveillance application can monitor whether the resource is accessed in background or foreground. For example, the surveillance application can collect information regarding whether the application uses the camera or voice recorder in the background.

In some cases, the resource usage data can be collected for a monitoring period. The monitoring period can be configured by the user of the electronic device, a manufacturer of the electronic device, a system administrator associated with the electronic device, or any combinations thereof. Example of the monitoring period can be a day, a week, a month or any other time period.

In some cases, the resource usage data can include information related to attempts to access a resource that has not been granted permission. For example, the resource was omitted in the permission request during installation because the resource was not included in the resource usage information at the application server. However, the application requests to access the resource on the electronic device when executed. Such information can be used to update the resource usage information stored at the application server.

At 406, the resource usage data is sent to a server, e.g., the usage information server 130 shown in FIG. 1. In some cases, the resource usage data also includes information related to the application and the electronic device that executes the application. For example, the information can include the version of the application, the version of the OS operating on the electronic device, the make and model of the electronic device.

The resource usage data can be sent periodically. The reporting period can be the same as, longer than or shorter than a monitoring period. The reporting period can be configured by the user of the electronic device, a manufacturer of the electronic device, a system administrator associated with the electronic device, or any combinations thereof. Alternatively or additionally, the resource usage data can be sent aperiodically. In one example, the server can query the resource usage data for one or more applications and the electronic device can send the resource usage data in response to the query.

The server collects the resource usage data from a plurality of electronic devices and compile the usage data. The server can aggregate the data over a period of time, a number of electronic devices, or a combination thereof to generate statistical data about resource usage of an application. In some cases, the server can also generate confidence level based on the number of reports the server received. For example, the confidence level can be low if the server receives a limited amount of usage data reports for an application, and therefore the compiled resource usage data may not be accurate. On the other hand, the confidence level can be high if the server receives a high number of usage data reports for an application, and therefore the compiled resource usage data is likely to be accurate. In some cases, one or more thresholds can be set for the number of usage data reports for an application, and the confidence level can be determined by comparing the number of received usage data reports with the thresholds. For example, if the number of received usage data reports is below a configured threshold, the confidence level is set to low. If the number of received usage data reports is above a configured threshold, the confidence level is set to high. Other statics analytical methods can also be used to determine the confidence level. In some cases, the server can send the confidence level with the compiled resource usage data to the application server.

In some cases, resource access for the same application may be different for different versions of the application, different versions of the OS, or different types of the electronic device. Therefore, before compiling, reported usage data can be segregated based the version of the application, the version of the OS, the make and model of the electronic device, or any combinations thereof. When an electronic device requests to download an application, the application server can determine the relevant information of the electronic device and send corresponding resource access information to the electronic device.

The server can send the compiled resource usage data to the application server periodically or upon request. In one example, the application server can request the compiled resource usage data for an application when a user requests to download the application. The application server can therefore send the resource usage data to the user who requests the download.

Collecting resource usage information from multiple electronic devices may provide one or more advantages. For example, sometimes, determining resource usage information based on application code inspection may be difficult or inaccurate. For example, an application may include a method call. The method call may access one of five resources based on different parameters determined at runtime. A determination based on the application code inspection may conclude that all five resources may be accessed. However, some of the five resources may not be accessed because the corresponding parameters may not realize at runtime. Therefore, resource usage information collected from actual executions of the application can provide additional information supplemental to the application code inspection results. Furthermore, collecting resource usage information from multiple electronic devices can provide usage patterns that assist a user to make an informed decision about granting permissions for an application.

In some cases, the application server can update the resource usage information of an application to electronic devices that have already installed the application. For example, new usage data can indicate that a resource previously determined not to be accessed by the application, and therefore not included in the resource usage information downloaded with the application, can be accessed by the application when executed. The application server can send updated resource usage information to the electronic device. The electronic device can generate additional permission requests for the resource based on the updated resource usage information. Alternatively or additionally, the application server can send updated resource usage information about how often a resource is used to the electronic device, periodically or aperiodically. The updated information can be outputted on the electronic device and the user can determine whether to keep the application or delete the application based on the updated information. In some cases, a notification, e.g., a blink, a flash, a bulb, or any other graphic user interface objects representing the notification, can be outputted on the electronic device to indicate that updated resource usage information is received. The user can access the permission user interface to receive detailed information about the resource usage.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
   receiving, at an electronic device, an installation manifest for an application, wherein the installation manifest indicates one or more resources on the electronic device that the application is configured to access;
   receiving, at the electronic device, resource usage information associated with the application, wherein the resource usage information indicates how often the application uses at least one of the one or more resources, and the resource usage information is determined based at least in part on an inspection of a binary code of the application, and wherein the inspection of the binary code of the application comprises determining one or more application program interfaces (APIs) that are called by the application to use the one or more resources;
   determining, by the electronic device and based on the resource usage information, that a particular resource among the one or more resources indicated by the installation manifest is not used by the application;
   generating, by the electronic device, a resource permission request for the application based on the installation manifest and the resource usage information, wherein generating the resource permission request comprises omitting, in the resource permission request, the particular resource that is determined not to be used by the application based on the resource usage information;
   outputting, at the electronic device, the resource permission request for the application;

receiving, in response to the resource permission request, a user input indicating whether the resource permission request is granted; and installing or executing the application based on the user input.

2. The method of claim 1, wherein the resource permission request indicates how often the application uses the at least one of the one or more resources.

3. The method of claim 1, wherein the resource usage information is determined based at least in part on collected resource usage data from a plurality of electronic devices.

4. The method of claim 1, further comprising:
executing the application at the electronic device;
determining, at the electronic device, resource usage data of the application on the electronic device; and
sending the resource usage data to a server.

5. The method of claim 4, further comprising:
determining a version of the application; and
sending the version of the application with the resource usage data to the server.

6. An electronic device, comprising:
a memory; and
at least one hardware processor communicatively coupled with the memory and configured to:
receive, at the electronic device, an installation manifest for an application, wherein the installation manifest indicates one or more resources on the electronic device that the application is configured to access;
receive, at the electronic device, resource usage information associated with the application, wherein the resource usage information indicates how often the application uses at least one of the one or more resources, and the resource usage information is determined based at least in part on an inspection of a binary code of the application, and wherein the inspection of the binary code of the application comprises determining one or more application program interfaces (APIs) that are called by the application to use the one or more resources;
determine, by the electronic device and based on the resource usage information, that a particular resource among the one or more resources indicated by the installation manifest is not used by the application;
generate, by the electronic device, a resource permission request for the application based on the installation manifest and the resource usage information, wherein generating the resource permission request comprises omitting, in the resource permission request, the particular resource that is determined not to be used by the application based on the resource usage information;
output, at the electronic device, the resource permission request for the application;
receive, in response to the resource permission request, a user input indicating whether the resource permission request is granted; and
install or execute the application based on the user input.

7. The electronic device of claim 6, wherein the resource permission request indicates how often the application uses the at least one of the one or more resources.

8. The electronic device of claim 6, wherein the resource usage information is determined based at least in part on collected resource usage data from a plurality of electronic devices.

9. The electronic device of claim 6, wherein the at least one hardware processor is configured to:
execute the application at the electronic device;
determine, at the electronic device, resource usage data of the application on the electronic device; and
send the resource usage data to a server.

10. The electronic device of claim 9, wherein the at least one hardware processor is configured to:
determine a version of the application; and
send the version of the application with the resource usage data to the server.

11. A non-transitory computer-readable medium containing instructions which, when executed, cause an electronic device to perform operations comprising:
receiving, at the electronic device, an installation manifest for an application, wherein the installation manifest indicates one or more resources on the electronic device that the application is configured to access;
receiving, at the electronic device, resource usage information associated with the application, wherein the resource usage information indicates how often the application uses at least one of the one or more resources, and the resource usage information is determined based at least in part on an inspection of a binary code of the application, and wherein the inspection of the binary code of the application comprises determining one or more application program interfaces (APIs) that are called by the application to use the one or more resources;
determining, by the electronic device and based on the resource usage information, that a particular resource among the one or more resources indicated by the installation manifest is not used by the application;
generating, by the electronic device, a resource permission request for the application based on the installation manifest and the resource usage information, wherein generating the resource permission request comprises omitting, in the resource permission request, the particular resource that is determined not to be used by the application based on the resource usage information;
outputting, at the electronic device, the resource permission request for the application;
receiving, in response to the resource permission request, a user input indicating whether the resource permission request is granted; and
installing or executing the application based on the user input.

12. The non-transitory computer-readable medium of claim 11, wherein the resource permission request indicates how often the application uses the at least one of the one or more resources.

13. The non-transitory computer-readable medium of claim 11, wherein the resource usage information is determined based at least in part on collected resource usage data from a plurality of electronic devices.

14. The non-transitory computer-readable medium of claim 11, the operations further comprising:
executing the application at the electronic device;
determining, at the electronic device, resource usage data of the application on the electronic device; and
sending the resource usage data to a server.

* * * * *